United States Patent
Saito et al.

(10) Patent No.: US 9,955,311 B2
(45) Date of Patent: Apr. 24, 2018

(54) CONTROL APPARATUS, POSITION VERIFICATION SYSTEM, NON-TRANSITORY COMPUTER READABLE MEDIUM, AND POSITION VERIFICATION METHOD

(71) Applicant: FUJI XEROX CO., LTD., Tokyo (JP)

(72) Inventors: Takahiro Saito, Yokohama (JP); Jiro Matsuda, Yokohama (JP); Tohru Fuse, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/210,160

(22) Filed: Jul. 14, 2016

(65) Prior Publication Data

US 2017/0272914 A1     Sep. 21, 2017

(30) Foreign Application Priority Data

Mar. 15, 2016    (JP) .................................. 2016-050715

(51) Int. Cl.
| | |
|---|---|
| *H04W 4/02* | (2009.01) |
| *H04W 64/00* | (2009.01) |
| *H04L 29/06* | (2006.01) |
| *H04W 84/12* | (2009.01) |

(52) U.S. Cl.
CPC ........... *H04W 4/028* (2013.01); *H04L 63/061* (2013.01); *H04L 63/0876* (2013.01); *H04W 64/00* (2013.01); *H04W 84/12* (2013.01)

(58) Field of Classification Search
CPC ..... H04W 4/028; H04W 64/00; H04W 84/12; H04L 63/0876; H04L 63/061
See application file for complete search history.

(56) References Cited

U.S. PATENT DOCUMENTS

| | | |
|---|---|---|
| 7,367,497 B1 | 5/2008 | Hill |
| 2005/0136845 A1 | 6/2005 | Masuoka et al. |
| 2009/0201149 A1 | 8/2009 | Kaji |
| 2014/0051461 A1* | 2/2014 | Ranki ....................... G01S 3/74 455/456.1 |
| 2015/0181374 A1* | 6/2015 | Tsuda ................. G01C 21/3697 455/457 |
| 2015/0264573 A1 | 9/2015 | Giordano et al. |
| 2015/0334511 A1* | 11/2015 | Rivera .................... G06F 21/44 455/41.2 |

FOREIGN PATENT DOCUMENTS

| | | |
|---|---|---|
| JP | 2000-348296 A | 12/2000 |
| JP | 2009-159336 A | 7/2009 |

OTHER PUBLICATIONS

Jul. 31, 2017 Office Action issued in Australian Patent Application No. 2016210586.

* cited by examiner

*Primary Examiner* — Chuong A Ngo
(74) *Attorney, Agent, or Firm* — Oliff PLC

(57) ABSTRACT

A control apparatus of the present invention includes: a detection unit that detects a position of a terminal apparatus, based on position information which is acquired from plural radio beacons by the terminal apparatus; a memory that stores a history of the position of the terminal apparatus as route information, based on the position detected by the detection unit; and a determination unit that determines whether or not a current position, at which the terminal apparatus is detected, is correct, based on route information of plural terminal apparatuses stored in the memory.

12 Claims, 15 Drawing Sheets

FIG. 7

| POSITION \ BEACON ID | B1 | B2 | B3 | B4 |
|---|---|---|---|---|
| (1) | 5-20 | 0-10 | 0-5 | 0-5 |
| (2) | 0-15 | 0-15 | 0-8 | 0-5 |
| (3) | 0-10 | 5-20 | 0-10 | 0-5 |
| (4) | 0-8 | 0-15 | 0-15 | 0-8 |
| (5) | 0-5 | 0-10 | 5-20 | 0-10 |
| ⋮ | ⋮ | ⋮ | ⋮ | ⋮ |
| (10) | 0-3 | 0-8 | 10-40 | 0-8 |
| (11) | 0-3 | 0-5 | 0-8 | 10-40 |

FIG. 8

| CONFERENCE ROOM | ROUTE INFORMATION |
|---|---|
| CONFERENCE ROOM A | (1)(8) |
| CONFERENCE ROOM A | (7)(6)(5)(4)(3)(2)(1)(8) |
| CONFERENCE ROOM B | (1)(2)(3)(9) |
| CONFERENCE ROOM B | (7)(6)(5)(4)(3)(9) |
| CONFERENCE ROOM C | (1)(2)(3)(4)(5)(10) |
| CONFERENCE ROOM C | (7)(6)(5)(10) |
| ⋮ | ⋮ |

FIG. 9

| DATES AND TIMES | PLACES | PARTICIPANTS | MANDATORY PARTICIPANTS |
|---|---|---|---|
| 2015/12/24 15:00-16:00 | CONFERENCE ROOM C | USER 1, USER 2, USER 3, USER 4 | USER 1, USER 2 |
| 2015/12/25 10:00-12:00 | CONFERENCE ROOM A | USER 5, USER 6, USER 7, USER 8 | USER 5, USER 6, USER 7 |
| 2015/12/25 10:00-12:00 | CONFERENCE ROOM D | USER 3, USER 4 | ALL |
| 2015/12/25 13:00-14:00 | CONFERENCE ROOM B | USER 1, USER 3, USER 9, USER 10 | USER 1, USER 9, USER 10 |
| 2015/12/25 13:00-15:00 | CONFERENCE ROOM C | USER 2, USER 5, USER 6, USER 8, USER 11 | USER 2, USER 11 |

FIG. 12

| TIME | BEACON INFORMATION FROM TERMINAL | SERVER POSITION DETERMINATION | ROUTE INFORMATION STORAGE | CONFERENCE ROOM DETERMINATION |
|---|---|---|---|---|
| t1 | B1:10, B2:5 | (1) | (1) | — |
| t2 | B1:5, B2:5 | (2) | (1)(2) | — |
| t3 | B1:2, B2:10, B3:3 | (3) | (1)(2)(3) | — |
| t4 | B2:5, B3:5 | (4) | (1)(2)(3)(4) | — |
| t5 | B2:2, B3:10, B4:3 | (5) | (1)(2)(3)(4)(5) | — |
| t6 | B2:2, B3:25, B4:2 | (10) | (1)(2)(3)(4)(5)(10) | CONFERENCE ROOM C |
| t7 | B2:1, B3:35, B4:3 | (10) | (1)(2)(3)(4)(5)(10)(10) | CONFERENCE ROOM C |

*FIG. 14*

| POSITION / BEACON ID | Ba | Bb |
|---|---|---|
| a | 5-10 | 0-5 |
| b | 5-20 | 5-15 |
| c | 5-15 | 5-20 |
| d | 5-15 | 5-20 |
| e | 0-5 | 5-15 |
| ⋮ | ⋮ | ⋮ |

FIG. 15

| USER | DESTINATION | ROUTE INFORMATION |
|---|---|---|
| USER 1 | ELEVATOR | a |
| USER 1 | STAIRS | a, b, c, d, e, f, g |
| USER 2 | ELEVATOR | e, d, c, b, a |
| USER 2 | STAIRS | e, f, g |
| ⋮ | ⋮ | ⋮ |

CONTROL APPARATUS, POSITION VERIFICATION SYSTEM, NON-TRANSITORY COMPUTER READABLE MEDIUM, AND POSITION VERIFICATION METHOD

CROSS-REFERENCE TO RELATED APPLICATION

This application is based on and claims priority under 35 USC 119 from Japanese Patent Application No. 2016-050715 filed on Mar. 15, 2016.

BACKGROUND (i) Technical Field

The present invention relates to a control apparatus, a position verification system, a non-transitory computer readable medium, and a position verification method.

SUMMARY

A control apparatus according to one aspect of the present invention includes: a detection unit that detects a position of a terminal apparatus, based on position information which is acquired from plural radio beacons by the terminal apparatus; a memory that stores a history of the position of the terminal apparatus as route information, based on the position detected by the detection unit; and a determination unit that determines whether or not a current position, at which the terminal apparatus is detected, is correct, based on route information of plural terminal apparatuses stored in the memory.

BRIEF DESCRIPTION OF THE DRAWINGS

The foregoing and additional features and characteristics of this disclosure will become more apparent from the following detailed descriptions considered with the reference to the accompanying drawings, wherein:

FIG. 7 is a diagram illustrating an example of information which is stored in a position information storage unit of the server apparatus according to the exemplary embodiment of the present invention;

FIG. 8 is a diagram illustrating an example of information which is stored in a route information storage unit of the server apparatus according to the exemplary embodiment of the present invention;

FIG. 9 is a diagram illustrating an example of information which is stored in a schedule information storage unit of the schedule server apparatus according to the exemplary embodiment of the present invention;

FIG. 12 is a diagram illustrating a history of a position that is stored based on the beacon information of FIG. 11;

FIG. 14 is a diagram illustrating an example of information which is stored in a position information storage unit of a server apparatus according to another exemplary embodiment of the present invention; and FIG. 15 is a diagram illustrating an example of information which is stored in a route information storage unit of the server apparatus according to another exemplary embodiment of the present invention.

DETAILED DESCRIPTION

Hereinafter, exemplary embodiments of the present invention will be described in detail with reference to the drawings.

Figure 1:
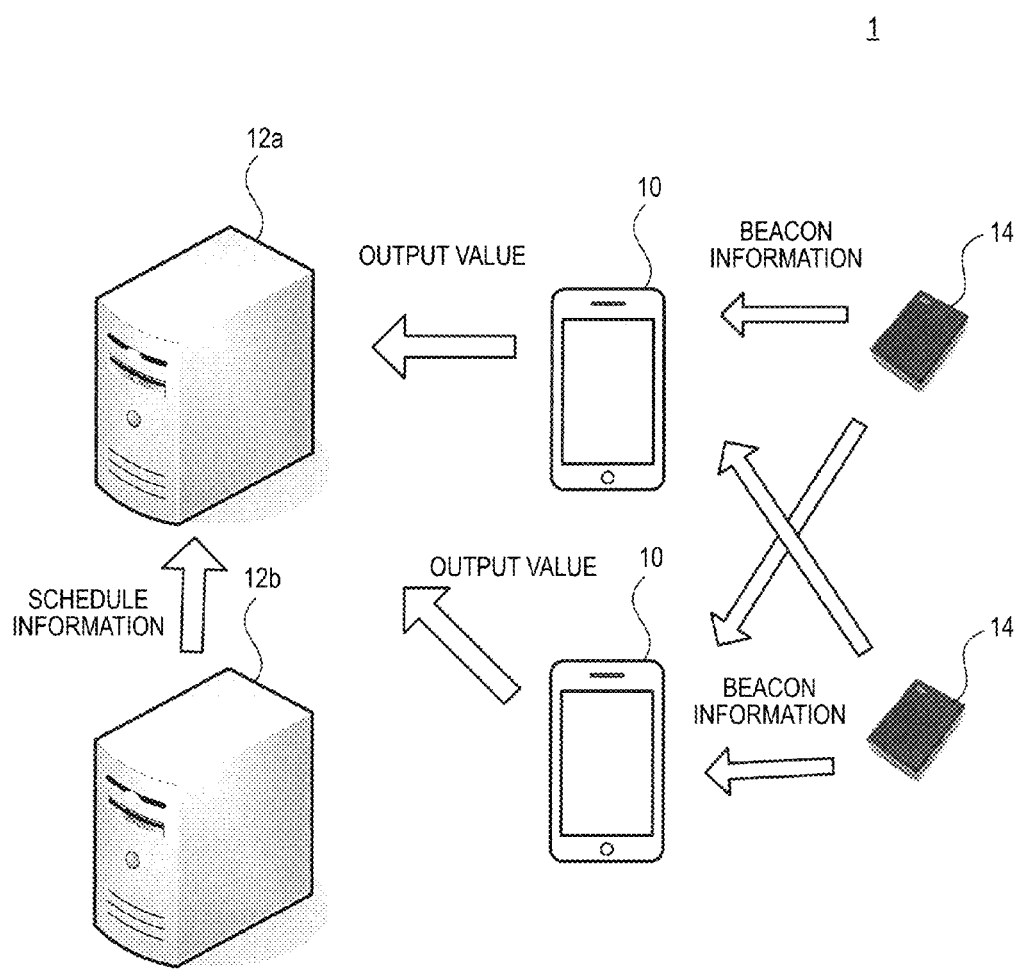
FIG. 1 is a system diagram illustrating an entire configuration of a position verification system according to an exemplary embodiment of the present invention.

FIG. 1 is a system diagram illustrating a position verification system 1 according to an exemplary embodiment of the present invention.

The position verification system 1 according to the exemplary embodiment of the present invention, as illustrated in FIG. 1, includes a portable terminal apparatus 10 such as a personal computer, a smart phone, and a tablet terminal apparatus, a server apparatus 12a which is a control apparatus, a schedule server apparatus 12b which provides schedule information, and plural beacons 14 which is a radio beacon.

Any terminal apparatus is applicable to the present invention, as long as the terminal apparatus 10 can be connected to the server apparatus 12a through a communication network.

The terminal apparatus 10 and the server apparatus 12a are connected through a wireless LAN terminal such as a Wi-Fi router or the Internet communication network, and transmit and receive information.

The beacon 14 includes a device of generating radio waves such as Bluetooth and is provided in a place of which position information is desired to be acquired. The beacon 14 is provided, for example, indoors such as in a conference room and a corridor, and always transmits radio waves (beacon information) about an ID for identifying the beacon.

The terminal apparatus 10 acquires radio waves (beacon information) from which the beacon 14 transmits, in the proximity of an area in which the beacon 14 is provided. The identifier and the received signal strength as beacon information are transmitted to the server apparatus 12a. The terminal apparatus 10 acquires the beacon information periodically, or in a case such as when the beacon information changes more than a predetermined threshold, when it is determined that the terminal apparatus 10 is moved based on the information from an acceleration sensor, or the like, and the terminal apparatus 10 transmits the beacon information to the server apparatus 12a. The terminal apparatus 10 receives data or a decryption key to decrypt encrypted data, from the server apparatus 12a.

The server apparatus 12a is used as a control apparatus that controls plural terminal apparatuses 10, and is configured to detect the position of the user who carries the terminal apparatus 10, based on the beacon information which is the position information acquired by the terminal apparatus 10, and store the position. Specifically, the server apparatus 12a detects the position of the user who carries the terminal apparatus 10, by acquiring the output value of the beacon information (the identifier and the received signal strength) which is received from the terminal apparatus 10, and specifying the position of the terminal apparatus 10 based on the values of plural pieces of beacon information at divided positions, and stores the history of the position in time series. Further, the server apparatus 12a determines whether or not the current position of the terminal apparatus 10 is correct based on route information which is stored in time series. The server apparatus 12a acquires schedule information from the schedule server apparatus 12b, and determines whether or not the current position of the terminal apparatus 10 is correct. Further, the server apparatus 12a transmits data to the terminal apparatus 10, encrypts and transmits data, limits the viewing of data by setting a disclosure period of data, or controls the decryption of data and the disclosure of data in the terminal apparatus 10.

The schedule server apparatus 12b stores plural pieces of schedule information, and extracts the schedule information in response to a request from the server apparatus 12a so as to transmit the extracted schedule information to the server apparatus 12a.

In the position verification system 1 according to the present exemplary embodiment, the terminal apparatus 10 acquires the radio waves of the beacon 14 which is provided indoors, and the terminal apparatus 10 transmits a beacon output value (the identifier and the received signal strength) which is beacon information, to the server apparatus 12a. The server apparatus 12a detects the position of the user (terminal apparatus 10) by specifying the position of the terminal apparatus 10 based on the values of plural pieces of beacon information at the divided positions, with reference to the acquired beacon output values, and stores the information in time series.

Figure 2:
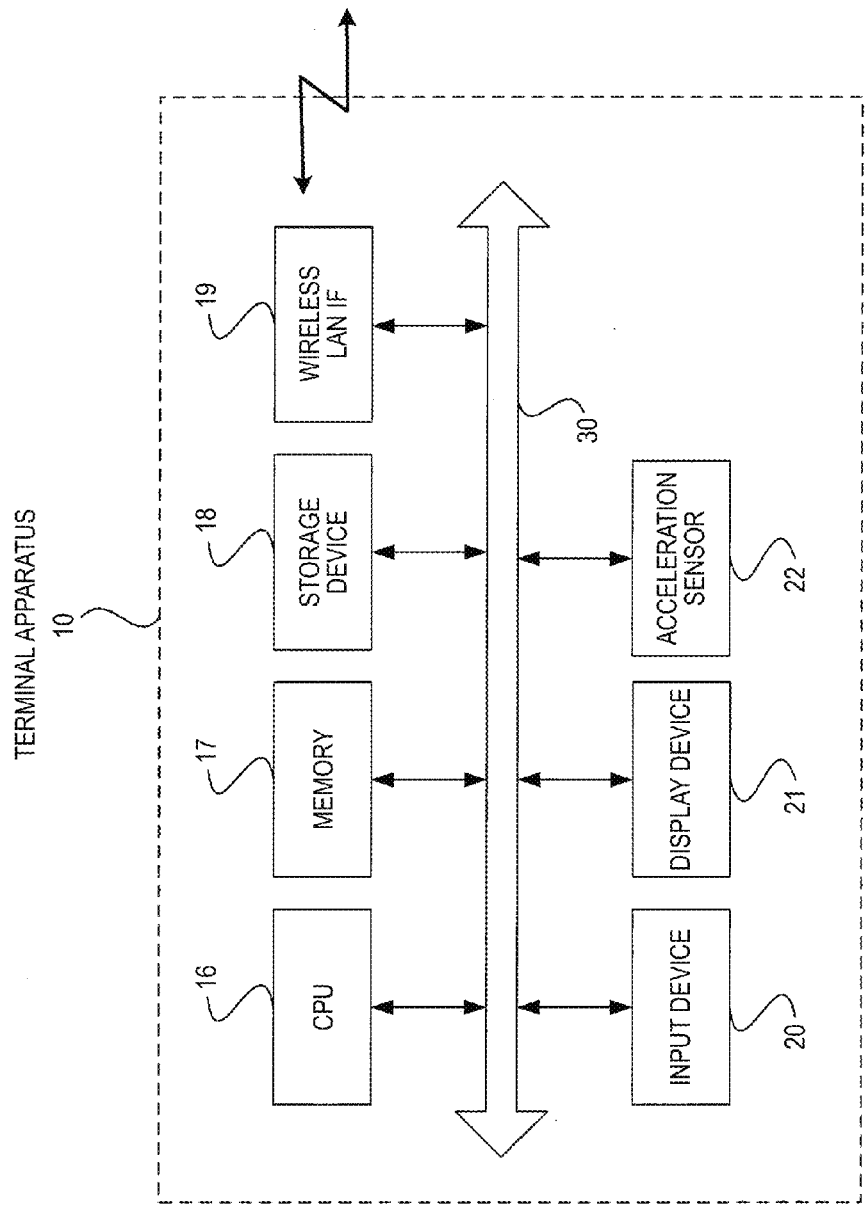
FIG. 2 is a block diagram illustrating a hardware configuration of a terminal apparatus according to the exemplary embodiment of the present invention.

As illustrated in FIG. 2, the terminal apparatus 10 includes a CPU 16, a memory 17 capable of temporarily storing data, a storage device 18 such as a flash memory, a wireless LAN interface (IF) 19 that performs wireless communication with a wireless LAN terminal to transmit and receive data, an input device 20 such as a touch sensor, a display device 21, and an acceleration sensor 22. Those components are interconnected through a control bus 30.

The terminal apparatus 10 according to the present exemplary embodiment is provided with a touch panel in which a touch sensor for detecting the position touched on the display device 21 is provided as the input device 20, and display is performed and input is performed by the user, by using the touch panel.

The CPU 16 controls the operation of the terminal apparatus 10 by executing a predetermined process based on the control program stored in the memory 17 or the storage device 18. Further, the control program can be obtained by being downloaded through the Internet communication network or a mobile telephone network and provided to the CPU 16, or the control program can be provided to the CPU 16 by being stored in a recording medium such as a CD-ROM.

The acceleration sensor 22 measures the acceleration (the rate of a change in velocity) of the terminal apparatus 10. It is determined that the terminal apparatus 10 is moved, based on the information of the acceleration sensor 22.

The terminal apparatus 10 according to the present exemplary embodiment performs an operation as described below in response to the execution of the control program, such that the authenticity of the detected position information of the terminal apparatus is guaranteed, and thus the terminal apparatus of which authenticity is guaranteed is allowed to receive, for example, data required for a conference, and to view data.

Figure 3:
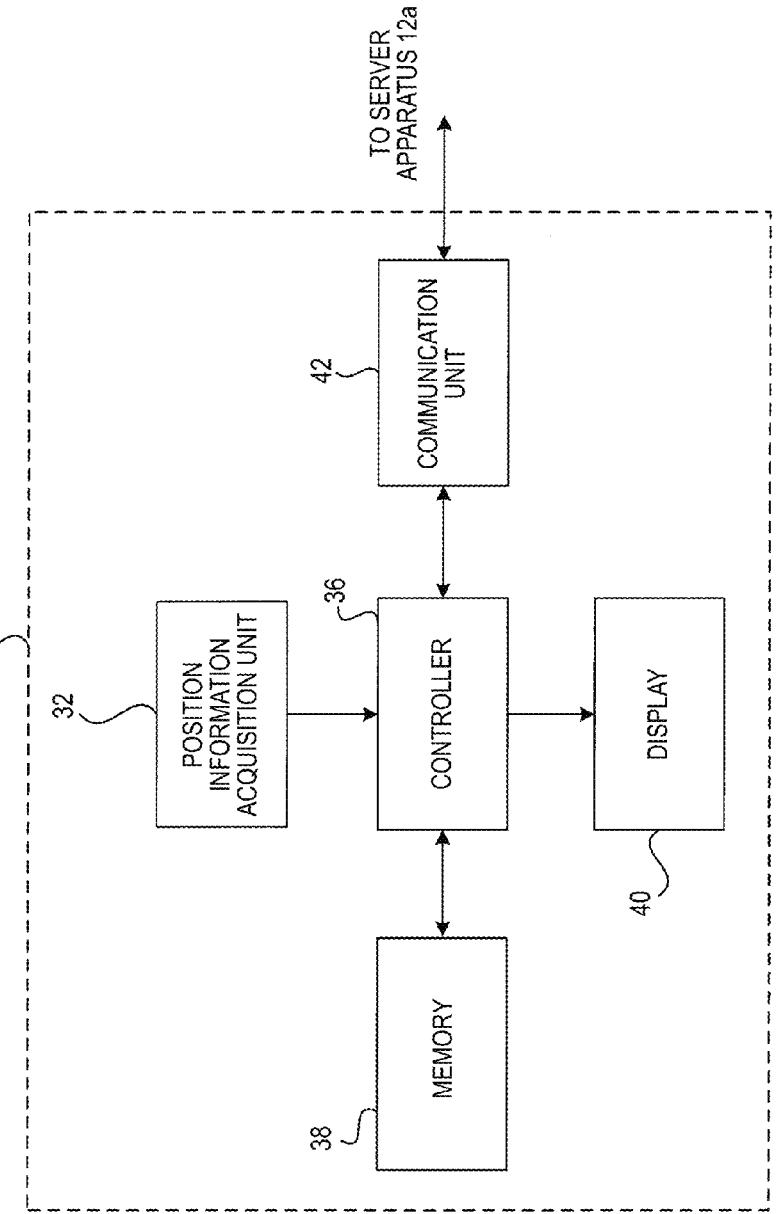
FIG. 3 is a block diagram illustrating a functional configuration of the terminal apparatus according to the exemplary embodiment of the present invention.

FIG. 3 is a block diagram illustrating a functional configuration of the terminal apparatus 10 which is implemented by the execution of the control program.

As illustrated in FIG. 3, the terminal apparatus 10 according to the exemplary embodiment includes a position information acquisition unit 32, a controller 36, a memory 38, a display 40, and a communication unit 42.

The position information acquisition unit 32 acquires beacon information of the beacon 14 which is provided in the proximity of the terminal apparatus 10.

The memory 38 stores various types of data which are received from the server apparatus 12a.

The display 40 performs display of various types of data, based on the control by the controller 36.

The communication unit 42 performs communication with the server apparatus 12a which is an external device.

The controller 36 transmits the beacon information which is acquired by the position information acquisition unit 32 to the server apparatus 12a through the communication unit 42. Further, the controller 36 performs control so as to acquire the beacon information periodically, in a case such as when the beacon information changes more than a predetermined threshold or when it is determined that the terminal apparatus 10 is moved based on the information from the acceleration sensor 22, and then transmits the acquired beacon information to the server apparatus 12a.

Further, the controller 36 performs control so as to display the position information which is acquired, on the display 40.

Next, the functional configuration of the server apparatus 12a in the position verification system according to the present exemplary embodiment will be described with reference to the block diagram of FIG. 4.

Figure 4:
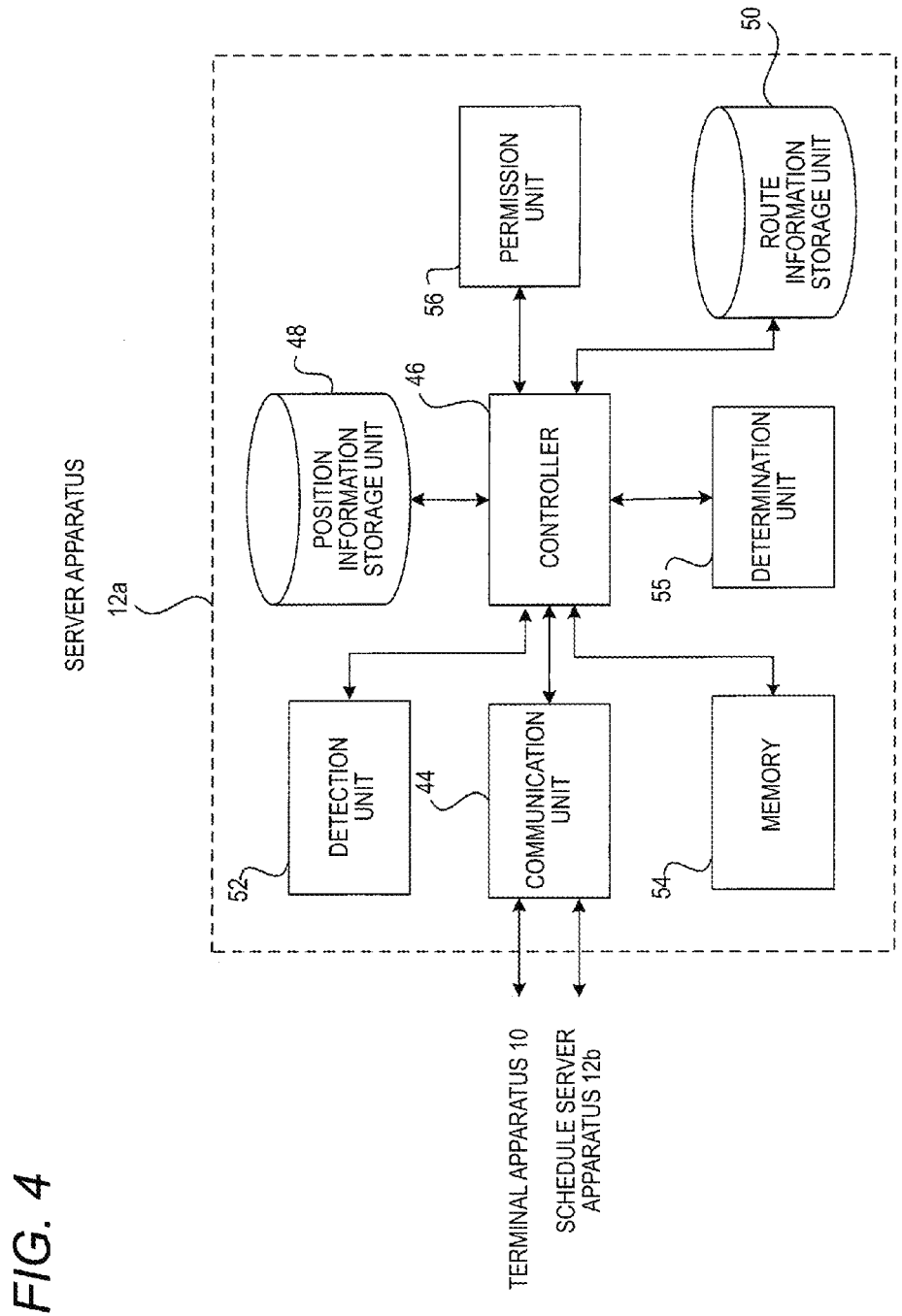
FIG. 4 is a block diagram illustrating a functional configuration of a server apparatus according to the exemplary embodiment of the present invention.

As illustrated in FIG. 4, the server apparatus 12a according to the present exemplary embodiment includes a communication unit 44, a controller 46, a position information storage unit 48, a route information storage unit 50, a detection unit 52, a memory 54, a determination unit 55, and a permission unit 56.

The position information storage unit 48 stores beacon information which is position information, and ID and information about the output values (received signal strengths) of plural beacons 14.

The route information storage unit 50 stores plural pieces of route information, and stores route information from a specific position to a destination.

The detection unit 52 detects the position (location) of the terminal apparatus 10 from the values of plural pieces of beacon information in divided positions, with reference to the beacon output values (the received signal strength) the terminal apparatus 10 acquires. Further, the detection unit 52 accesses the schedule server apparatus 12b and extracts schedule information which is stored in the schedule information storage unit 64, from date and time when the terminal apparatus 10 accesses the server apparatus 12a.

The memory 54 stores the history of the position of the terminal apparatus 10 which is detected by the detection unit 52 as route information in time series.

The determination unit 55 determines whether or not the present position of the terminal apparatus 10 is correct, based on the plural pieces of route information stored in the memory 54 and the information stored in the route information storage unit 50. The determination unit 55 acquires schedule information from the schedule server apparatus 12b which will be described later, and determines whether or not the current position of the terminal apparatus 10 is correct.

The permission unit 56 permits the transmission of data, in a case where the determination unit 55 determines that the current position of the terminal apparatus 10 is correct, or determines that the access time of the terminal apparatus, of which the current position is determined as correct, matches time period information of the schedule information. The permission unit 56 permits the transmission of a decryption key to decrypt the encrypted data, and permits the viewing of data having viewing restriction.

In a case where the position information is acquired from the terminal apparatus 10, the controller 46 performs control so as to detect the position of the terminal apparatus 10 and store the history, based on the plural pieces of data which are stored in the position information storage unit 48, or so as to determine whether or not the position information is correct, based on the route information or the schedule information. Further, the controller 46 controls the permission unit 56 so as to permit the transmission of data, and performs control so as to transmit data to the terminal apparatus 10 through the communication unit 44, transmit a decryption key of the encrypted data, or release the viewing limit of data to enable the viewing of the data.

Next, the functional configuration of the schedule server apparatus 12b in the position verification system according to the exemplary embodiment will be described with reference to the block diagram of FIG. 5.

Figure 5:
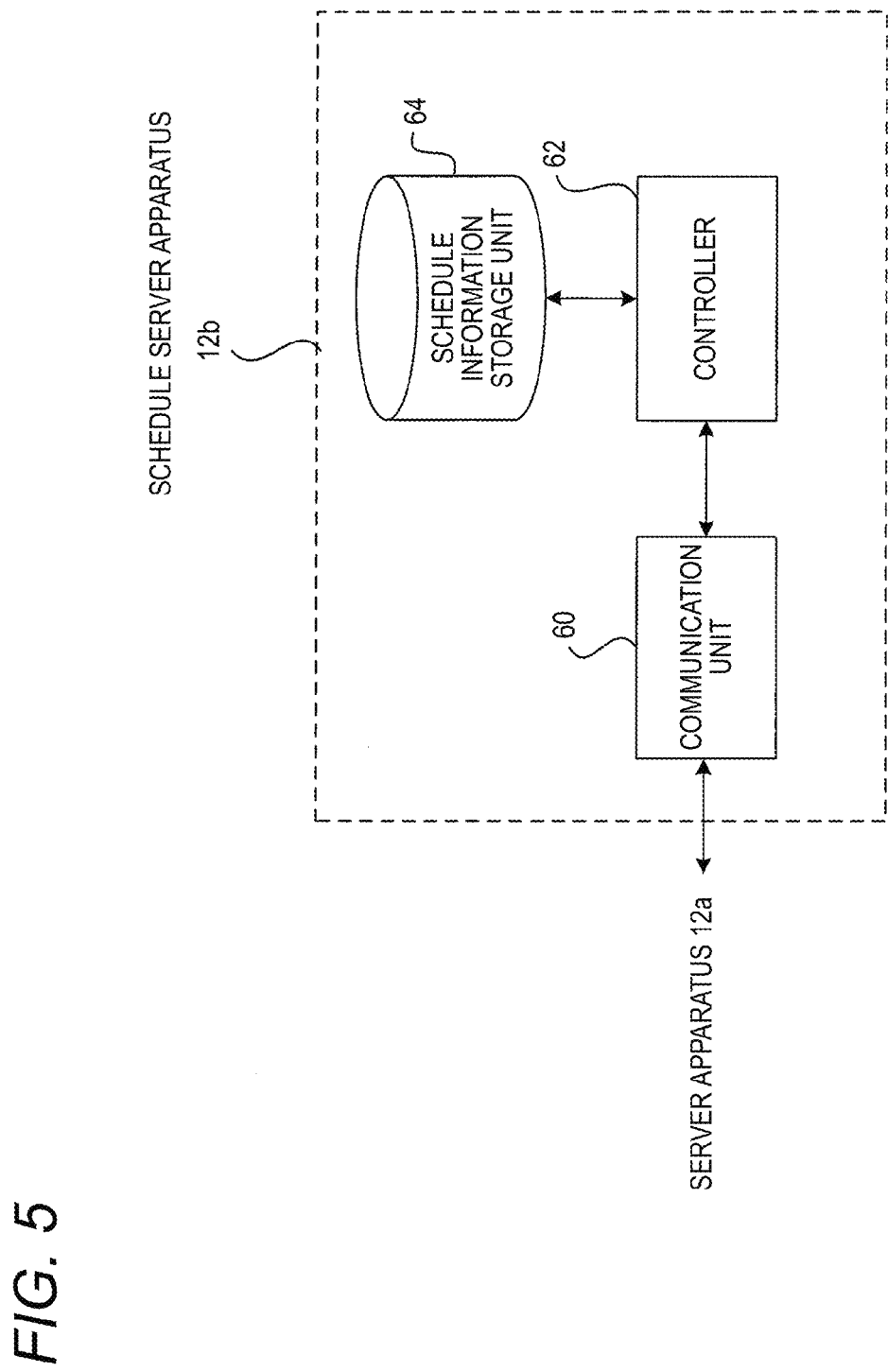
FIG. 5 is a block diagram illustrating a functional configuration of a schedule server apparatus according to the exemplary embodiment of the present invention.

As illustrated in FIG. 5, the schedule server apparatus 12b according to the exemplary embodiment includes a communication unit 60, a controller 62, and a schedule information storage unit 64.

The schedule information storage unit 64 stores, for example, plural pieces of schedule information such as dates and times, locations, participants, and mandatory participants. The dates and times are stored as time period information, the locations are stored as position information, the participants are stored as terminal information of the terminal apparatus 10 that the participants use.

In a case where there is a transmission request of schedule information from the server apparatus 12a, the controller 62 performs control so as to extract information which satisfies the request, from among plural pieces of data which are stored in the schedule information storage unit 64, and transmit the extracted information to the server apparatus 12a through the communication unit 60.

In addition, although the case is described in which the schedule server apparatus 12b is separately provided from the server apparatus 12a in the exemplary embodiment, without being limited thereto, the schedule information storage unit 64 may be provided in the server apparatus 12a.

Next, the specific example of the position verification system 1 according to the exemplary embodiment of the present invention will be described with reference to FIG. 6 to FIG. 12.

Figure 6:
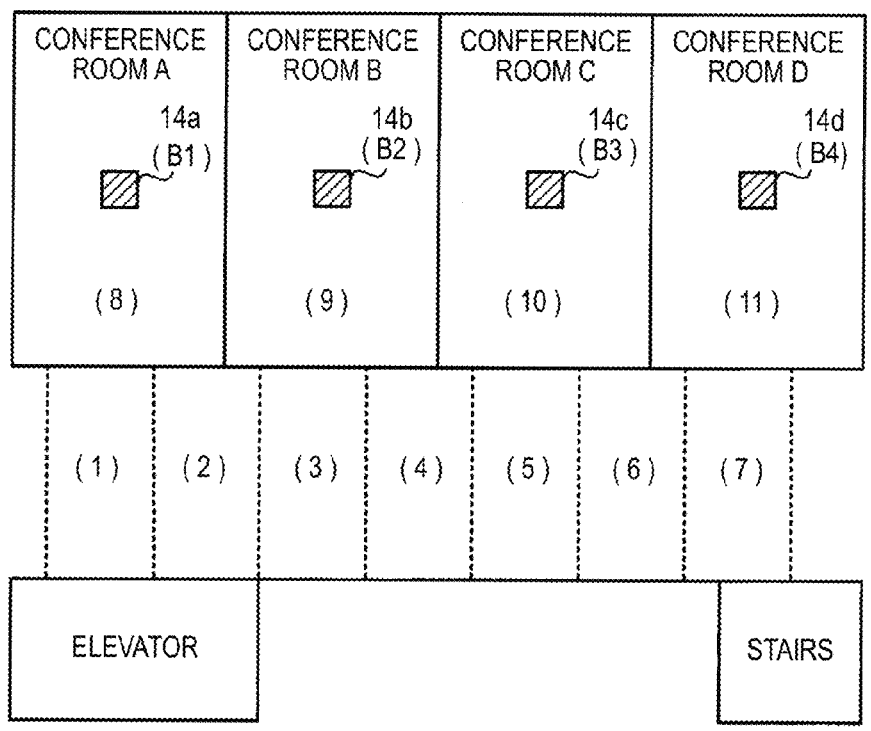
FIG. 6 is a diagram illustrating a position verification system according to the exemplary embodiment of the present invention, which illustrates the installation positions of beacons and sections for route information.

FIG. 6 is a diagram illustrating the installation positions of beacons 14 and sections for route information. As illustrated in FIG. 6, a conference room A, a conference room B, a conference room C, and a conference room D are provided in order from the elevator side between the elevator side and the stair side on the same floor, having the corridor interposed therebetween. The corridor from the elevator side to the stair side is divided into seven sections: a section (1), a section (2), a section (3), a section (4), a section (5), a section (6), and a section (7) in order from the elevator side. In addition, the conference room A is assumed to a section (8), the conference room B is assumed to a section (9), the conference room C is assumed to a section (10), and the conference room D is assumed to a section (11).

A beacon 14a is provided in the conference room A. Here, the beacon ID of the beacon 14a is assumed to B1. A beacon 14b is provided in the conference room B. Here, the beacon ID of the beacon 14b is assumed to B2. A beacon 14c is provided in the conference room C. Here, the beacon ID of the beacon 14c is assumed to B3. A beacon 14d is provided in the conference room D. Here, the beacon ID of the beacon 14d is assumed to B4.

FIG. 7 is a diagram illustrating the installation position of the beacon 14, illustrated in FIG. 6, which is stored in the position information storage unit 48 of the server apparatus 12a and the received signal strength of the beacon 14.

The received signal strengths of the respective beacons 14a, 14b, 14c, and 14d, which are detected, in a case where the terminal apparatus 10 passes through the sections (1) to (7) illustrated in FIG. 6, or is located in the sections (8) to (11) are indicated by the values of 0 to 40.

FIG. 8 is a diagram illustrating an example of information which is stored in the route information storage unit 50 of the server apparatus 12a. In other words, there are two routes through which the user who carries the terminal apparatus 10 goes to the conference room A which is a destination: a route passing through the section (1) and the section (8) starting from the elevator, and a route passing through the section (7), the section (6), the section (5), the section (4), the section (3), the section (2), the section (1) and the section (8) starting from the stairs, as illustrated in FIG. 6. Similarly, the route information for each of the conference room B, the conference room C, and the conference room D is stored in the route information storage unit 50.

FIG. 9 is a diagram illustrating an example of information which is stored in the schedule information storage unit 64 of the schedule server apparatus 12b.

Figure 10:
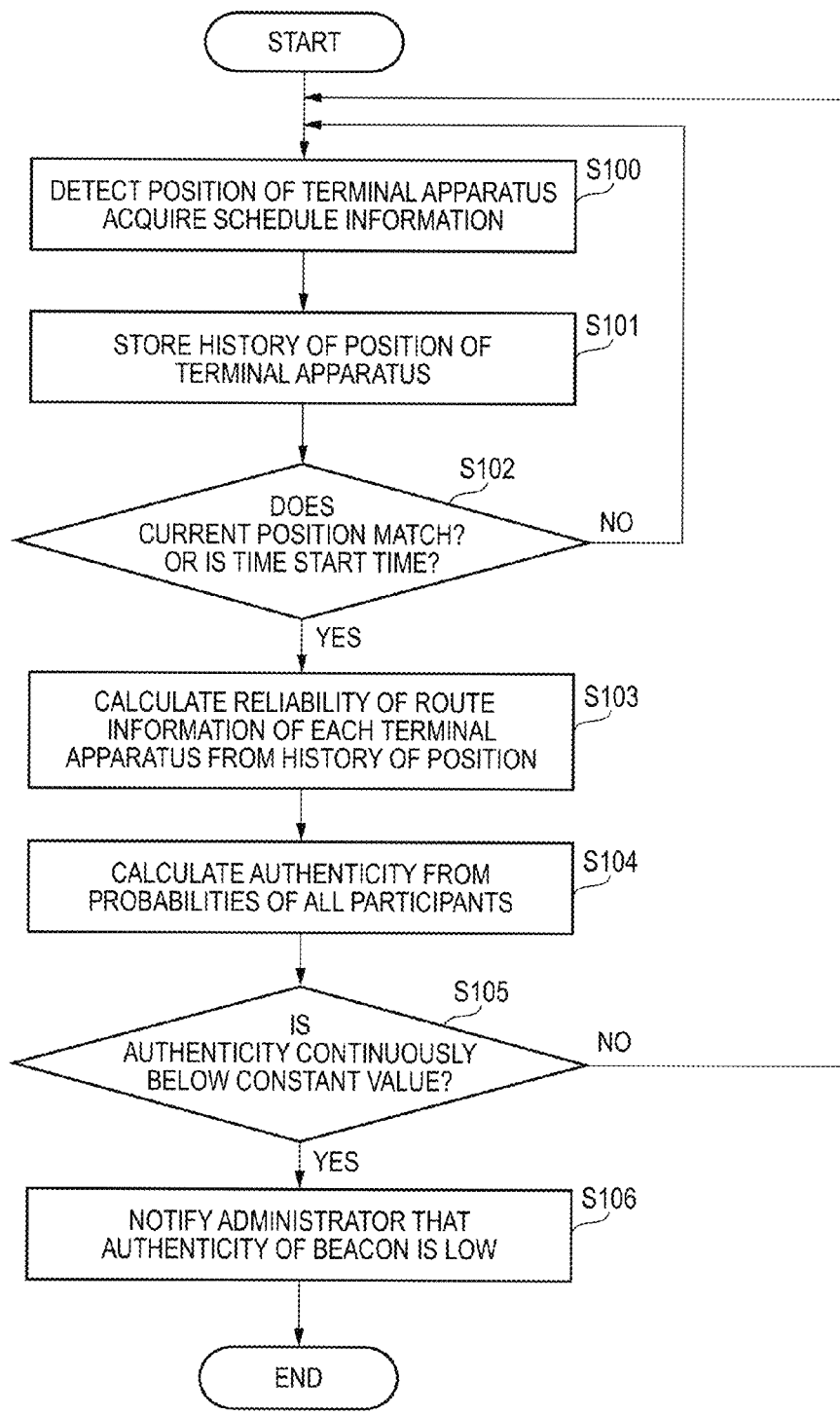
FIG. 10 is a flowchart illustrating an operation of the server apparatus according to the exemplary embodiment of the present invention.

FIG. 10 is a flowchart illustrating an operation of the server apparatus 12a. In the present exemplary embodiment, an operation based on schedule information in which date and time is 2015/12/24 15:00-16:00, location is the conference room C, the participants are a user 1, a user 2, a user 3, and a user 4, and the mandatory participants are the user 1 and the user 2, among the schedule information in FIG. 9 will be described as an example. The user 1, the user 2, the user 3, and the user 4 are respectively associated with the terminal apparatuses 10a, 10b, 10c, and 10d which are carried by the respective users.

In step 100 (S100), the detection unit 52 calculates the position information and detects the positions of the terminal apparatuses 10a to 10d, based on the beacon information which is received from the terminal apparatuses 10a, 10b, 10c, and 10d. Schedule information is extracted and received from a time when the terminal apparatuses 10a to 10d access the server apparatus 12a, based on the time period information (2015/12/24 15:00-16:00 in the present exemplary embodiment) stored in the schedule information storage unit 64 of the schedule server apparatus 12b of FIG.

9. A time taken to arrive at the conference room is considered and extracted as the time when the server apparatus 12*a* is accessed.

Next, in step 101 (S101), the history (route information) of the positions of the terminal apparatuses 10*a* to 10*d* which are detected in step 100 is stored in the memory 54.

Figure 11:
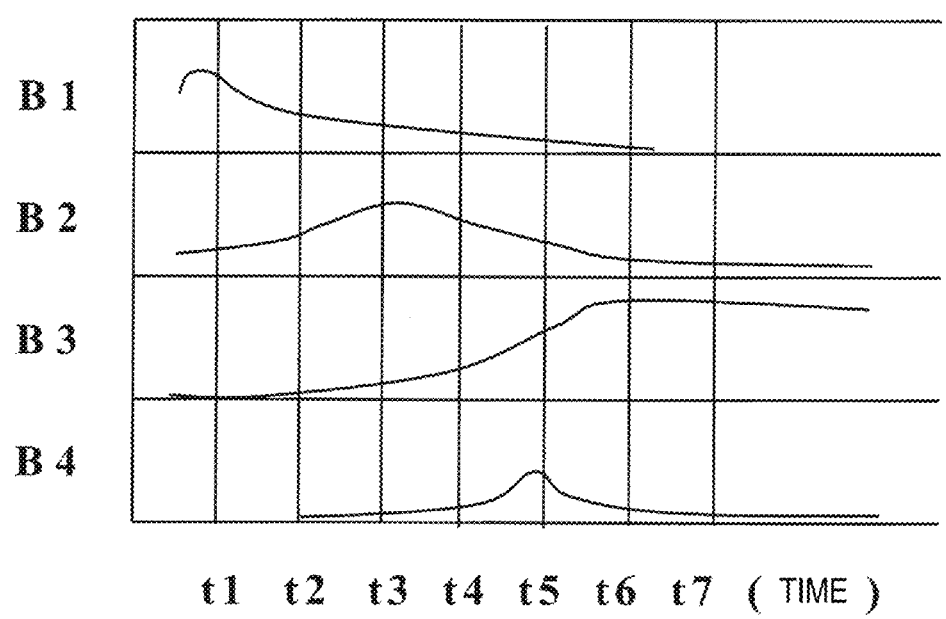
FIG. 11 is a diagram illustrating an example of a history of beacon information that the server apparatus according to the exemplary embodiment of the present invention acquires from the terminal apparatus.

FIG. 11 is a diagram illustrating a change of time and the received signal strengths of the beacon 14*a* (B1), the beacon 14*b* (B2), the beacon 14*c* (B3), and the beacon 14*d* (B4), which are acquired by the terminal apparatus 10*a*. FIG. 12 is a diagram illustrating the history of position which is stored based on the beacon information of FIG. 11.

At first, at a time t1, the received signal strength of the beacon 14*a* (B1) is 10, the received signal strength of the beacon 14*b* (B2) is 5, and radio waves cannot be detected from the beacon 14*c* (B3) and the beacon 14*d* (B4). The server apparatus 12*a* determines that the current position of the terminal apparatus 10*a* is the section (1) from the beacon information illustrated in FIG. 7, and stores the position as route information.

Next, at a time t2, the received signal strength of the beacon 14*a* (B1) is 5, the received signal strength of the beacon 14*b* (B2) is 5, and radio waves are hardly detected from the beacon 14*c* (B3) and the beacon 14*d* (B4). The server apparatus 12*a* determines that the current position of the terminal apparatus 10*a* is the section (2) from the beacon information illustrated in FIG. 7, and stores the position as route information.

Next, at a time t3, the received signal strength of the beacon 14*a* (B1) is 2, the received signal strength of the beacon 14*b* (B2) is 10, the received signal strength of the beacon 14*c* (B3) is 3, and the received signal strength of the beacon 14*d* (B4) is a value close to 0.

The server apparatus 12*a* determines that the current position of the terminal apparatus 10*a* is the section (3) from the beacon information illustrated in FIG. 7, and stores the position as route information.

Next, at a time t4, the received signal strength of the beacon 14*a* (B1) is a value close to 0, the received signal strength of the beacon 14*b* (B2) is 5, the received signal strength of the beacon 14*c* (B3) is 5, and the received signal strength of the beacon 14*d* (B4) is a value close to 0.

The server apparatus 12*a* determines that the current position of the terminal apparatus 10*a* is the section (4) from the beacon information illustrated in FIG. 7, and stores the position as route information.

Next, at a time t5, the received signal strength of the beacon 14*a* (B1) is a value close to 0, the received signal strength of the beacon 14*b* (B2) is 2, the received signal strength of the beacon 14*c* (B3) is 10, and the received signal strength of the beacon 14*d* (B4) is 3.

The server apparatus 12*a* determines that the current position of the terminal apparatus 10*a* is the section (5) from the beacon information illustrated in FIG. 7, and stores the position as route information.

Next, at a time t6, the received signal strength of the beacon 14*a* (B1) is a value close to 0, the received signal strength of the beacon 14*b* (B2) is 2, the received signal strength of the beacon 14*c* (B3) is 25, and the received signal strength of the beacon 14*d* (B4) is 2.

The server apparatus 12*a* determines that the current position of the terminal apparatus 10*a* is the section (10), from the beacon information illustrated in FIG. 7, stores the position as route information, and determines that the terminal apparatus 10 is located in the conference room C.

Next, at a time t7, radio waves cannot be detected from the beacon 14*a* (B1), the received signal strength of the beacon 14*b* (B2) is 1, the received signal strength of the beacon 14*c* (B3) is 35, and the received signal strength of the beacon 14*d* (B4) is 3.

The server apparatus 12*a* determines that the current position of the terminal apparatus 10*a* is the section (10) from the beacon information illustrated in FIG. 7, and determines that the terminal apparatus 10*a* is located in the conference room C from the stored route information.

In other words, in a case where the section (10) is detected at the time t6, it is determined that the terminal apparatus 10*a* is located in the conference room C, and it is determined that a route to the conference room C is correct based on the stored route information (the history of the position information) in FIG. 12, and the route information which is stored in the route information storage unit 50 in FIG. 8.

In other words, the position of the user 1 who carries the terminal apparatus 10*a* is detected based on the route information. The positions of the users 2, 3, and 4 who carry the terminal apparatuses 10*b*, 10*c*, and 10*d* in a similar way to the user 1.

Next, in step 102 (S102), it is determined whether or not the current positions of the terminal apparatuses 10*a* to 10*d*, which are respectively detected, match the respective pieces of position information (in the present exemplary embodiment, the conference room C) of the extracted and received schedule information. In addition to the case where the current position of each of the terminal apparatuses 10*a* to 10*d* of all participants matches the position information of the schedule information, it may be determined whether or not the current position of each of the terminal apparatus 10*a* and the terminal apparatus 10*b* of the users 1 and 2 who are mandatory participants matches the position information of the schedule information. Alternatively, a determination as to the start time (15:00 in the present exemplary embodiment) of the extracted and received schedule information is made. In a case where the current position and the start time respectively do not match the schedule information, the process returns to step 100. In a case where either the current position or the start time matches the schedule information, the process proceeds to the next step 103 (S103). It should be noted that the start time is set to be earlier, with consideration of a time to arrive at the conference room.

Then, in step 103 (S103), the server apparatus 12*a* calculates the reliability of the route information from the history of the positions of the terminal apparatuses 10*a* to 10*d*, which are stored in the memory 54.

In step 104 (S104), the authenticity of the position information is calculated from the probabilities of the user 1 to user 4 who are all participants in the schedule information.

Here, as a method for determining the authenticity, when the number of target people is N and the reliability of the route of the n-th person is Cn, the reliability C can be calculated as follows.

$$C = 1 - \prod_{n=1}^{N} (1 - Cn)$$

The range of values of reliability C is 0 to 1.0.

In other words, reliability C=0 indicates that there is no data. Further, reliability C=1.0 indicates that the detected position information is 100% reliable.

In the present exemplary embodiment, for example, if it is assumed that the reliability of the user 1 is 0.8, the reliability of the user 2 is 0.7, the reliability of the user 3 is 0.6, and the reliability of the user 4 is 0.5, in which the users 1 to 4 gather in the conference room C through a regular route, the entire reliability C is closer to 1 as the number of people increases, in such a manner that the reliability is 0.8, if the number of users is 1 (the user 1); the reliability is 0.94, if the number of users is 2 (the user 1 and the user 2); the reliability is 0.976, if the number of users is 3 (the user 1 to the user 3); and the reliability is 0.988, if the number of users is 4 (the user 1 to the user 4). The average value of data pieces which are collected from the past is used for the reliability of each user. Further, the probability is calculated in consideration of the case where some of the route information is missing, or another position is applied.

Therefore, the authenticity of the position information is improved by using the information or the like in the case of a conference or the like in which plural people participate.

In step 105 (S105), it is determined whether or not the authenticity of the position information is continuously below a constant value. In a case where the authenticity is continuously below a constant value, the process proceeds to step 106 (S106), and the administrator is notified that the authenticity of the beacon is low. Further, in a case where the value in the route indicates an abnormal value, the administrator is notified of this fact. If the authenticity of the position information is not continuously below the constant value, the process returns to step 100.

In other words, the server apparatus 12a acquires the beacon information of the terminal apparatuses 10a, 10b, 10c, and 10d that are carried by the users 1, 2, 3, and 4 who participate in the conference in the conference room C, and the schedule information about a conference or the like, and it is checked if the position information that is acquired from the beacon 14 is correct, based on the history of the positions and the route information of the terminal apparatuses 10a, 10b, 10c, and 10d that are carried by the users 1, 2, 3, and 4 who are participants in the schedule information. In other words, the authenticity of the position information is guaranteed.

In a case where the authenticity of the position information is guaranteed, the transmission of data to the terminal apparatus 10, of which authenticity is guaranteed, is permitted. Incidentally, in addition to the case of permitting the transmission of data, a decoding key to decrypt the encrypted data, which is already transmitted, may be transmitted, or the viewing restriction of the data in the server apparatus 12a may be released.

Next, a position verification system 1 according to another exemplary embodiment of the present invention will be described with reference to FIG. 13 to FIG. 15.

Figure 13:
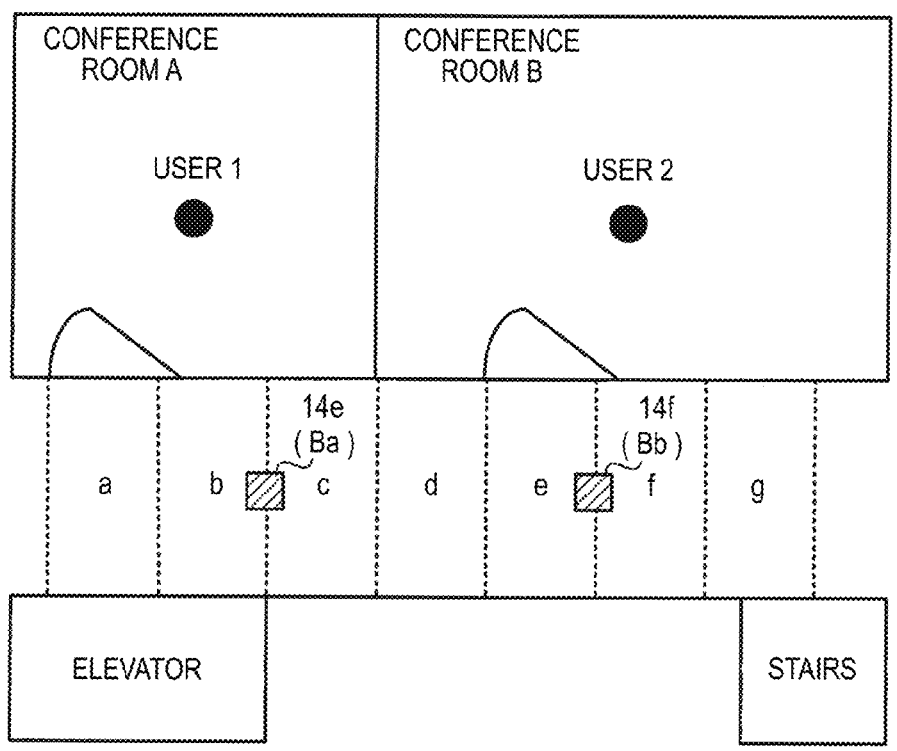
FIG. 13 is a diagram illustrating a position verification system according to another exemplary embodiment of the present invention, which illustrates the installation positions of beacons and sections for route information.

FIG. 13 is a diagram illustrating the installation positions of beacons 14 and sections for route information. As illustrated in FIG. 13, a conference room A and a conference room B are provided in order from the elevator side between the elevator side and the stair side on the same floor, while the corridor is interposed therebetween. The corridor from the elevator side to the stair side is divided into seven sections, that is, a section a, a section b, a section c, a section d, a section e, a section f, and a section g from the elevator side. In addition, a route from the position of each user to the elevator or the stairs will be described, in which the user 1 is located in the conference room A, the user 2 is located in the conference room B.

A beacon 14e is provided between the section b and the section c, in the corridor, and a beacon 14f is provided between the section e and the section f. Here, the beacon ID of the beacon 14e is assumed to Ba. Further, the beacon ID of the beacon 14f is assumed to Bb.

FIG. 14 is a diagram illustrating the installation positions (section) of the beacons 14, illustrated in FIG. 13, and the received signal strength of the beacon 14, which are stored in the beacon information storage unit 48 of the server apparatus 12a, and the received signal strengths of the beacon 14e (Ba) and the beacon 14f (Bb) which are detected when the terminal apparatus 10 which each user carries passes through the sections a to g illustrated in FIG. 13 are indicated by the values of 0 to 20.

FIG. 15 is a diagram illustrating an example of information which is stored in the route information storage unit 50 of the server apparatus 12a. In other words, in a case where the user 1 leaves the conference room A and moves to a destination, there are a route passing through the section a using the elevator, and a route passing through the sections a, b, c, d, e, f, and g using the stairs. Further, in a case where the user 2 leaves the conference room B and moves to a destination, there are a route passing through the sections e, d, c, b, and a using the elevator, and a route passing through the sections e, f, and g using the stairs.

In other words, the position of the terminal apparatus is detected by using the radio waves from plural beacons, the history of the detected position is stored, and the route information and schedule information related to plural routes are estimated, such that it is possible to increase the reliability of the position of the user, and transmit data using a limited privileges in the position.

It should be noted that the present invention is not limited to the above exemplary embodiment, and various modifications are possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control apparatus comprising:
   a detection unit that detects a position of a terminal apparatus, based on position information which is acquired from plural radio beacons by the terminal apparatus;
   a memory that stores a history of the position of the terminal apparatus as route information, based on the position detected by the detection unit; and
   a determination unit that determines whether or not a current position, at which the terminal apparatus is detected, is correct, based on route information of plural terminal apparatuses stored in the memory,
   wherein at least one hardware processor is configured to implement the detection unit and the determination unit.

2. The control apparatus according to claim 1, further comprising:
   a schedule information detection unit that detects schedule information including time period information, position information, and terminal information,
   wherein the determination unit determines whether or not the current position, at which the terminal apparatus is detected, is correct, based on the route information of plural terminal apparatuses stored in the memory and schedule information which is detected by the schedule information detection unit.

3. The control apparatus according to claim 2, further comprising;
a permission unit that permits a transmission of data, when the determination unit determines that an access time of the terminal apparatus, of which the current position is determined as correct, matches time period information of the schedule information.

4. The control apparatus according to claim 1,
wherein the route information is set by dividing a route to a destination into plural sections, and
wherein the memory not only continuously stores continuous sections, but also continuously stores the same section, or discontinuously stores continuous sections, as appropriate route information.

5. The control apparatus according to claim 1,
wherein when the determination unit is not able to determine whether or not the position, at which the terminal apparatus is detected, is correct, based on the route information of plural terminal apparatuses stored in the memory, the determination unit notifies an administrator of this fact.

6. The control apparatus according to claim 1,
wherein when the route information of the terminal apparatus stored in the memory indicates an abnormal value, the determination unit notifies an administrator of this fact.

7. The control apparatus according to claim 1, further comprising;
a permission unit that permits a transmission of data, when the determination unit determines that the current position of the terminal apparatus is correct,
wherein the at least one hardware processor is configured to implement the permission unit.

8. The control apparatus according to claim 7,
wherein the permission unit permits the transmission of a decryption key to decrypt a encrypted data, and permits a viewing of data having viewing restriction.

9. The control apparatus according to claim 7,
wherein the permission unit permits the transmission of a decryption key to decrypt a encrypted data, and permits a viewing of data having viewing restriction.

10. A position verification system comprising:
a control apparatus according to claim 1;
plural radio beacons; and
a terminal apparatus which acquire position information from the plural radio beacons.

11. A non-transitory computer readable medium storing a program causing a computer to execute a process, the process comprising:
detecting a position of a terminal apparatus, based on position information acquired from plural radio beacons by the terminal apparatus;
storing a history of the position of the terminal apparatus as route information, based on the detected position; and
determining whether or not a current position, at which the terminal apparatus is detected, is correct, based on route information of plural terminal apparatuses which are stored.

12. A position verification method, comprising:
detecting a position of a terminal apparatus, based on position information which is acquired from plural radio beacons by the terminal apparatus;
storing a history of the position of the terminal apparatus as route information, based on the position detected by the detecting; and
determining whether or not a current position, at which the terminal apparatus is detected, is correct, based on route information of plural terminal apparatuses.

* * * * *